Figure 3:
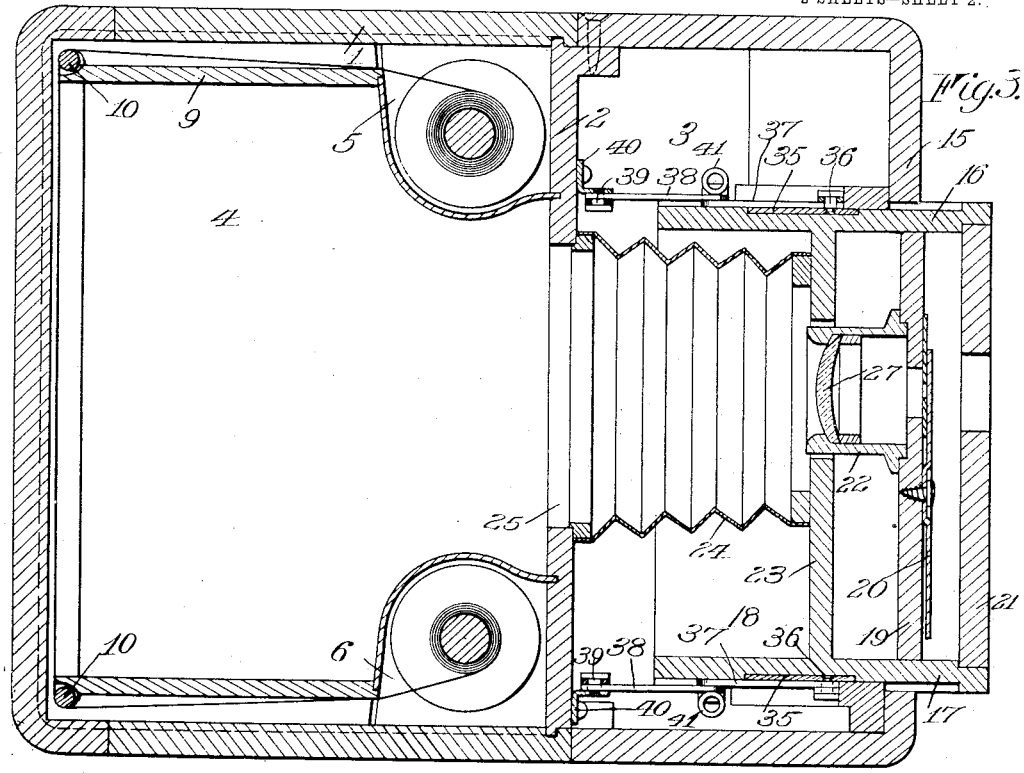

No. 831,324. PATENTED SEPT. 18, 1906.
F. A. BROWNELL.
LENS FOCUSING MECHANISM FOR CAMERAS.
APPLICATION FILED JULY 18, 1905.
2 SHEETS—SHEET 1.
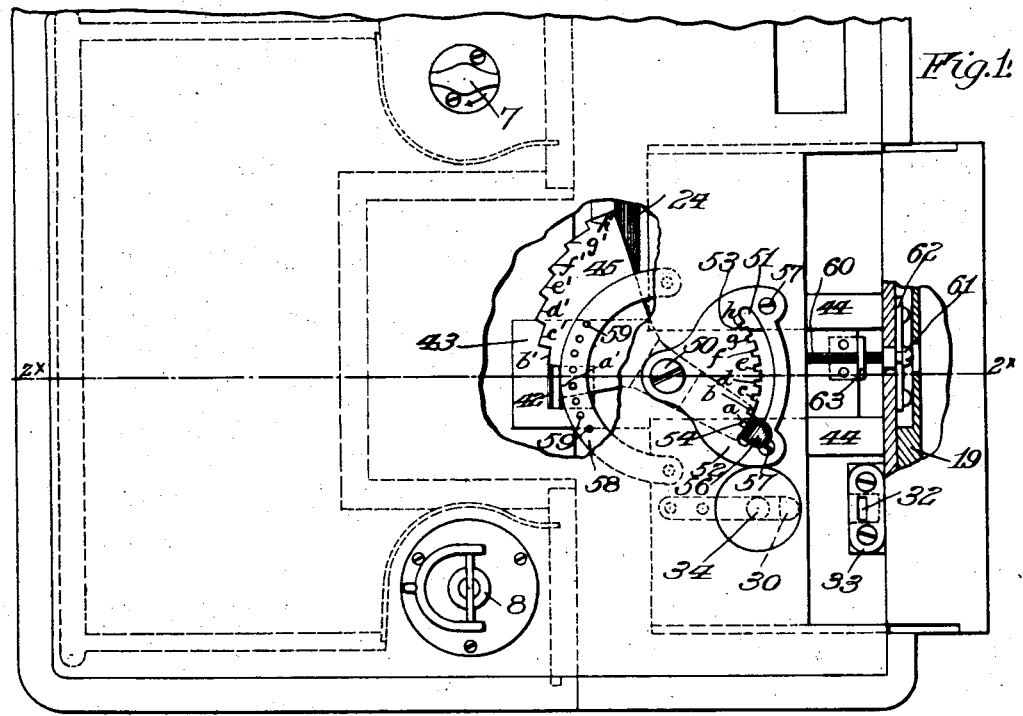

No. 831,324.  
PATENTED SEPT. 18, 1906.  
F. A. BROWNELL.  
LENS FOCUSING MECHANISM FOR CAMERAS.  
APPLICATION FILED JULY 18, 1905.

2 SHEETS—SHEET 2.

Witnesses  
M. J. St. Helens  
E. J. Aldrich

Inventor  
Frank A. Brownell  
By Frederick F. Church  
His Attorney

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

LENS-FOCUSING MECHANISM FOR CAMERAS.

No. 831,324.          Specification of Letters Patent.          Patented Sept. 18, 1906.

Application filed July 18, 1905. Serial No. 270,219.

*To all whom it may concern:*

Be it known that I, FRANK A. BROWNELL, of Rochester, in the county of Monroe and State of New York, have invented certain new and useful Improvements in Lens-Focusing Mechanism for Cameras; and I do hereby declare the following to be a full, clear, and exact description of the same, reference being had to the accompanying drawings, forming a part of the specification, and to the reference characters marked thereon.

My present invention relates to photographic cameras; and it has for its object to provide suitable mechanism adapted to be applied thereto, whereby the camera-lens and its focal plane or the focusing-screen may be relatively positioned to produce clear and well-defined images of objects located at different distances from the camera by the adjustment of a stop member to limit the relative automatic movement of said screen and the carriage supporting the lens in contradistinction to the usual manual adjustment of the lens-carriage on the camera-bed.
To these and other ends the invention consists in certain improvements and combinations of parts, all as will be hereinafter more fully described, the novel features being pointed out in the claims at the end of the specification.

Figure 4:
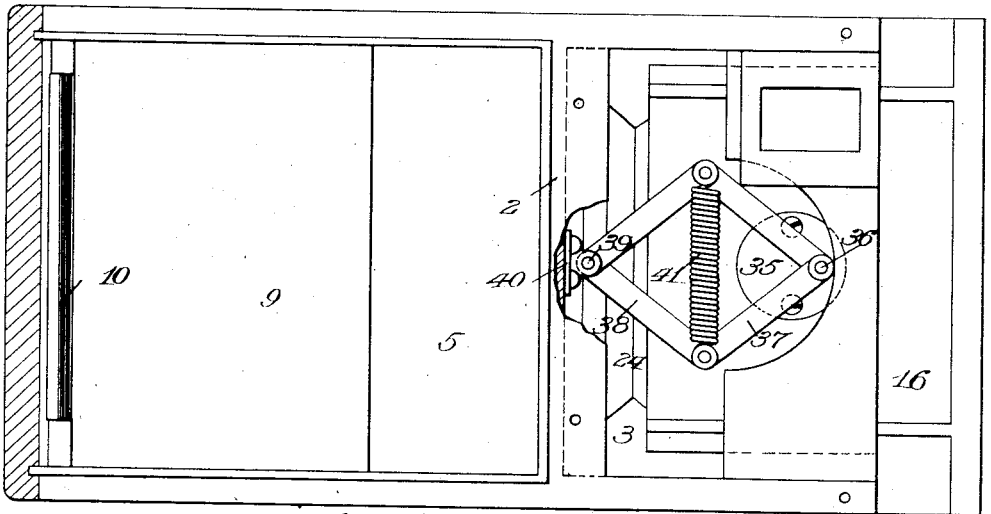

In the drawings, Figure 1 is a side elevation of a camera, illustrating the application thereto of the devices embodying my invention. Fig. 2 is a horizontal sectional view taken on the line 2× 2× of Fig. 1. Fig. 3 is a vertical sectional view. Fig. 4 is a top plan view showing a portion of the outer casing removed.

Similar reference characters of the several figures indicate similar parts.

In illustrating the present embodiment of my invention I have shown it in connection with a camera comprising a rectangular casing 1, divided by a transversely-extending partition 2 into front and rear chambers 3 and 4. The latter is provided with pockets 5 and 6, adapted, respectively, to contain a spool or cartridge of film and a winding spool or reel, the former being centered upon suitable devices 7 and the latter connected to a winding-key 8, operable from the exterior of the casing 1. Extending rearwardly from each of the pockets are light-excluding partitions 9, having at their extremities guide-rollers 10, which serve to support the film extending across the rear side of the chamber 4 in the focal plane of the camera-lens and forming the focusing-screen on which the image is produced. If desired, suitable devices may be provided on the camera for supporting a holder adapted to contain a glass plate which may be used in lieu of the strip of sensitized film.

Located in the chamber 3 and guided in the front wall 15 of the camera-casing is a lens-carriage, which is preferably rectangular and comprises the upper and lower walls 16 and 17, respectively, and the side walls 18. The rear or inner ends of the latter are located within the side walls of the camera-casing and their outer ends are offset in alinement therewith, as shown particularly in Fig. 2, and between them is supported the shutter-board 19, provided with shutter-leaves 20, and a front or cover 21. In rear of the shutter-board 19 is the lens 21, supported in a mounting-tube 22, which projects through an aperture in a partition 23, connected by a bellows 24 with the edges of the aperture 25 in the partition 2, said connection being adapted to exclude the passage of rays of light into the camera-casing in rear of the lens while the latter is adjusted relatively to the focusing-screen. When in its normal position, the lens-carriage is retracted, so that the cover 21 is in alinement with the face of the front 15, and it is retained in this closed position by a spring-finger 30, having a latch end 31, coöperating with the aperture 32 in a plate 33 on the carriage, from which it may be disengaged at the will of the operator by pressure upon a finger-piece or button 34. On the upper and lower walls 16 and 17 of the lens-carriage are plates 35, carrying studs 36, on which are journaled the forward ends of a pair of arms 37. These are connected at their rear ends to a pair of arms 38, pivoted on a stud 39, carried on a bracket 40, rigidly connected to the outer face of the partition 2. Extending across the joints between the two pairs of arms 37 and 38 and connected thereto is a coil-spring 41, which is distended when the lens-carriage is in its normal or closed position and exerts a constant force tending to project the carriage outwardly.

The means for limiting the relative movement of the lens-carriage in the camera-casing, to enable it to be readily adjusted into the proper position for producing, on the focusing-screen, accurately-defined images of objects located at various distances from the camera is accomplished by the coöperation of a relatively movable stop member on one of the parts coöperating with an abutment on the other part, which is capable of adjustment by the operator to limit their relative movement. In the present instance I have shown the abutment (indicated by 42) on a plate 43, located between guides 44 on one of the side walls 18 of the lens-carriage. The movable stop member comprises a plate 45, journaled on the inner end of a screw 50 and located on the inner face of the side of the camera-casing adjacent the abutment. The side of the casing is provided with a segmental aperture 51, and fitting over it on the exterior of the camera is a plate 52, having a similar slot arranged concentric with the pivotal center of the plate 45 and provided at one side with a plurality of notches or teeth 53, with which coöperates a lug or projection 54 on the yielding laterally-extending operating end 55 of the plate 45, the extremity of which is provided with a finger-piece 56, by means of which it may be depressed to disengage the projection from one or another of the notches. Each of the latter represent the position of adjustment for the member 45 when it is desired to arrest the lens-carriage to focus the lens upon objects at different distances—such as ten, fifteen, or one hundred feet, as well as other distances from the camera—and the notches are therefore designated by the letters $a, b, c, d, e, f, g$, and $h$. The plate 52 is centered and held accurately in position by the body of the screw 50 and by smaller fastening devices, such as screws 57, arranged at its outer corners.

The movable stop member formed by the plate 45, is provided with a plurality of shoulders $a', b', c', d', e', f', g'$, and $h'$, corresponding to the notches $a-h$ in the plate 52, which are arranged successively at increasing distances from the center of movement of the plate 45 and correspond to the focal distance of the lens when the lens-carriage is set for making an exposure of an object located at a distance from the camera, said distances being designated by numerals or other characters on the scale opposite the several notches $a-h$. In order to facilitate the adjustment of the movable stop, so that each of the several shoulders thereon may be properly positioned relatively to the abutment 42 when the projection 54 is disengaged from the plate 52, I provide a segmental ring 58, having a series of apertures or depressions 59, with which a prick-point or pin (not shown) arranged on the face of the plate 45 may coöperate.

Inasmuch as the focal lengths of different lenses may vary slightly within certain limits, which will determine the relative distance between it and the focusing-screen, I provide means for adjusting the abutment 42, whereby a greater movement of the lens-carriage may be obtained for a long-focus lens than will be required if a lens having a shorter focal length is employed when both of said lenses are focused on objects at equal distances from them. To obtain this adjustment, the plate 43, carrying the stop 42, may be moved longitudinally on the carriage by means of a screw 60, passing through a threaded lug 63 and having a duplex head 61, engaging opposite sides of a plate 62, located against the shoulder formed by the offset in the wall 18 at the forward end of the carriage. The plate 62 is preferably located in the rear of the shutter-board 19, and access to the head of the screw may be obtained through an aperture in said board when the cover 21 is removed.

The operation of the devices heretofore described will be readily understood. Assuming the camera to be closed—that is, with the lens-carriage retracted in its normal position with its face in alinement with the forward end of the camera—the pivotal points 36 and 39 of the pairs of operating-arms 37 and 38 will be in closer proximity than shown in the illustrations Figs. 3 and 4, placing the springs 41 under an increased tension. The operator when desiring to focus the lens presses the finger-piece 56 inwardly to disengage the lug 54 thereon, when it may be rotated to any desired point on the index-plate 15, and when released the lug thereon will coöperate with one of the notches or teeth $a-h$. This movement swings the plate 45 about its axis, causing the corresponding step or shoulder $a'-h'$ to be arrested in alinement with the abutment 42. By pressure upon the button 34 the latch end 31 of the spring 30 may be disengaged from the plate 32 to release the lens-carriage and permit it to be impelled forwardly by the springs 41 until its movement is limited by the engagement of the stop 42 with one of the steps or shoulders on the movable stop member 45.

A camera embodying the devices I have described is simple in construction and the focusing mechanism itself may be readily applied and when inserted in a camera it may be adjusted in the first instance so that the lens may be focused quickly and always with the same degree of accuracy even when the camera is operated by an unskilled person.

I claim as my invention—

1. In a camera, the combination with a casing, of a longitudinally-movable lens-carriage and a pivoted member mounted on one of said parts, and a plurality of graduated stops on said member adapted to coöperate with the other part to limit their relative movement.

2. In a camera, the combination with a casing, of a longitudinally-movable lens-carriage, a pivoted member mounted on one of said parts and located within the camera having a plurality of graduated stops adapted to coöperate with the other part, and means arranged exteriorly of the camera for adjusting said member.

3. In a camera, the combination with a casing, and a longitudinally-movable lens-carriage, of a relatively stationary stop arranged on one of said parts, an adjustable member on the other part, a plurality of graduated shoulders on the adjustable member and means for adjusting said member to place one or another of said shoulders in alinement with the stop.

4. In a camera, the combination with a casing, and a longitudinally-movable lens-carriage having a stop thereon, of an adjustable member on the casing, a plurailty of shoulders thereon and means for moving the member to place one or another of its shoulders into operative position relatively to the stop.

5. The combination with a camera, comprising a lens-carriage and a focusing-screen, said parts being relatively movable, of a member mounted on one of the parts, a plurality of stops thereon each of which is adapted to coöperate with the other part and means operating to move the carriage and screen relatively away from each other.

6. The combination with a camera, comprising a lens-carriage and a focusing-screen, of operating devices tending to move the carriage and screen relatively away from each other, a stationary stop on one of the parts and a movable member on the other, a plurality of stepped shoulders on the movable member and means for adjusting the member to successively position said shoulders in alinement with the stop.

7. The combination with a camera, comprising a lens-carriage and a focusing-screen, said parts being movable relatively toward and from each other, devices operating to separate the carriage and screen and means for locking them against the action of said devices, of a member mounted on one of the parts having a plurality of stops adapted to coöperate with the other part to limit their relative movement and means for releasing said locking means.

8. In a camera, the combination with a casing and a movable lens-carriage therein, means normally operating to project it and a locking device holding it in retracted position, of a pivoted member arranged on one of the parts of the camera and provided with a plurality of graduated stops coöperating with the other part, a device for adjusting said member and means for releasing the locking device.

9. In a camera, the combination with a casing, a lens-carriage guided in the casing and means for projecting it therefrom, of a locking device securing it in retracted position, a stop on the carriage, a member pivoted in alinement with the stop, a plurality of stepped shoulders on the member and means for operating said member to adjust one or another of said shoulders into opposition to the stop.

10. In a camera, the combination with a casing and a lens-carriage guided to move longitudinally therein, of two coöperating stop members arranged on the casing and carriage, one of them being adjustable relatively to the other and a plurality of stepped shoulders provided on one of said members.

11. In a camera, the combination with a casing and a lens-carriage movable longitudinally therein, of two stop members located on the casing and carriage, one of said members being adjustable relatively to the other and a plurality of shoulders provided on the adjustable member and coöperating with the other member to arrest the lens-carriage in various positions of adjustment.

12. In a camera, the combination with a casing having a front wall provided with an opening and a lens-carriage guided in the casing and normally closing said opening in the front wall, of means for moving the carriage outwardly, a locking device for normally retaining it in the closed position and means for limiting the outward movement of the carriage when unlocked.

13. In a camera, the combination with a casing comprising side walls and a front wall having an opening, a lens-carriage guided in the casing and normally closing said opening and side walls on the carriage arranged in alinement with the side walls of the casing, of focusing mechanism comprising means for projecting the carriage and adjustable stop devices arranged between the casing and carriage in rear of the side walls on the latter.

14. In a camera, the combination with a casing having a front wall provided with an opening, a partition in the casing arranged in rear of said wall and a lens-carriage guided in the casing, of focusing mechanism comprising means connected to the partition and carriage for projecting the latter outwardly and an adjustable stop for limiting its movement.

15. In a camera, the combination with a casing having a front wall provided with a transversely-extending aperture and side walls having rearwardly-extending recesses at the ends of said aperture and a lens-carriage guided in the casing having a front normally closing said aperture and side walls fitting said recesses, of focusing mechanism comprising means for projecting the carriage and devices arranged between the casing and carriage in rear of the side walls of the latter for automatically limiting the outward movement of the carriage.

16. In a camera, the combination with a casing, a lens-carriage guided therein and spring-operated jointed arms journaled on the casing and carriage and operating to automatically project the latter, of an abutment on the carriage, a pivoted graduated stop-plate on the casing coöperating with the abutment and means for adjusting the plate.

17. The combination with a camera comprising a casing, a lens-carriage and means for operating it, of an abutment on one of the parts, a plate pivoted on the other part provided with shoulders arranged at relatively increasing distances from the pivoted point of the plate and adapted to coöperate with the abutment and means for adjusting the plate.

18. The combination with a camera comprising a casing, a lens-carriage and means for operating it, of an abutment on the carriage, a plate pivoted on the casing and provided with stepped shoulders, an operating end on the plate projecting exteriorly of the casing and an indicating-scale on the latter coöperating with said end.

19. The combination with a camera comprising a casing, a lens-carriage and means for operating it, of an abutment on one of the parts, means for adjusting it to vary its relative position on said part, a movable member on the other part provided with stepped shoulders located out of alinement one with another and means for adjusting said member to aline one of said shoulders with the abutment.

20. The combination with a camera comprising a casing, a lens-carriage and means for operating it, of an abutment on the carriage, means for adjusting the abutment longitudinally thereon and a plate pivoted on the casing and provided with stepped shoulders and means for rotating the plate to successively aline said shoulders with the abutment.

21. The combination with a camera comprising a casing, a lens-carriage and means for operating it, of an abutment on the carriage, a plate journaled on the casing having stepped shoulders coöperating with the abutment, a notched scale-plate and a spring-operating finger on the plate coöperating with said notches.

22. In a camera, the combination with a casing, a movable lens-carriage therein and means for operating it, of an abutment on the carriage, a stop-plate having stepped shoulders coöperating with the abutment and located within the casing and a scale-plate arranged on the exterior of the casing and provided with notches, an operating-finger on the plate coöperating with said notches and a securing device centering the scale-plate and forming a journal for the stop-plate.

23. In a camera, the combination with a casing, a movable lens-carriage therein and means for operating it, of an abutment on the carriage, a pivoted stop-plate having stepped shoulders coöperating with the abutment and a notched scale-plate, a yielding operating-finger on the stop-plate interlocking with the notches in the scale-plate and a centering-piece coöperating with the stop-plate to center the latter when the operating-finger is disengaged from the scale-plate.

FRANK A. BROWNELL.

Witnesses:
G. WILLARD RICH,
WALTER B. PAYNE.